March 18, 1947.   C. MOTT ET AL   2,417,511
TORCH CUTTING MACHINE
Filed Nov. 10, 1943   2 Sheets-Sheet 1
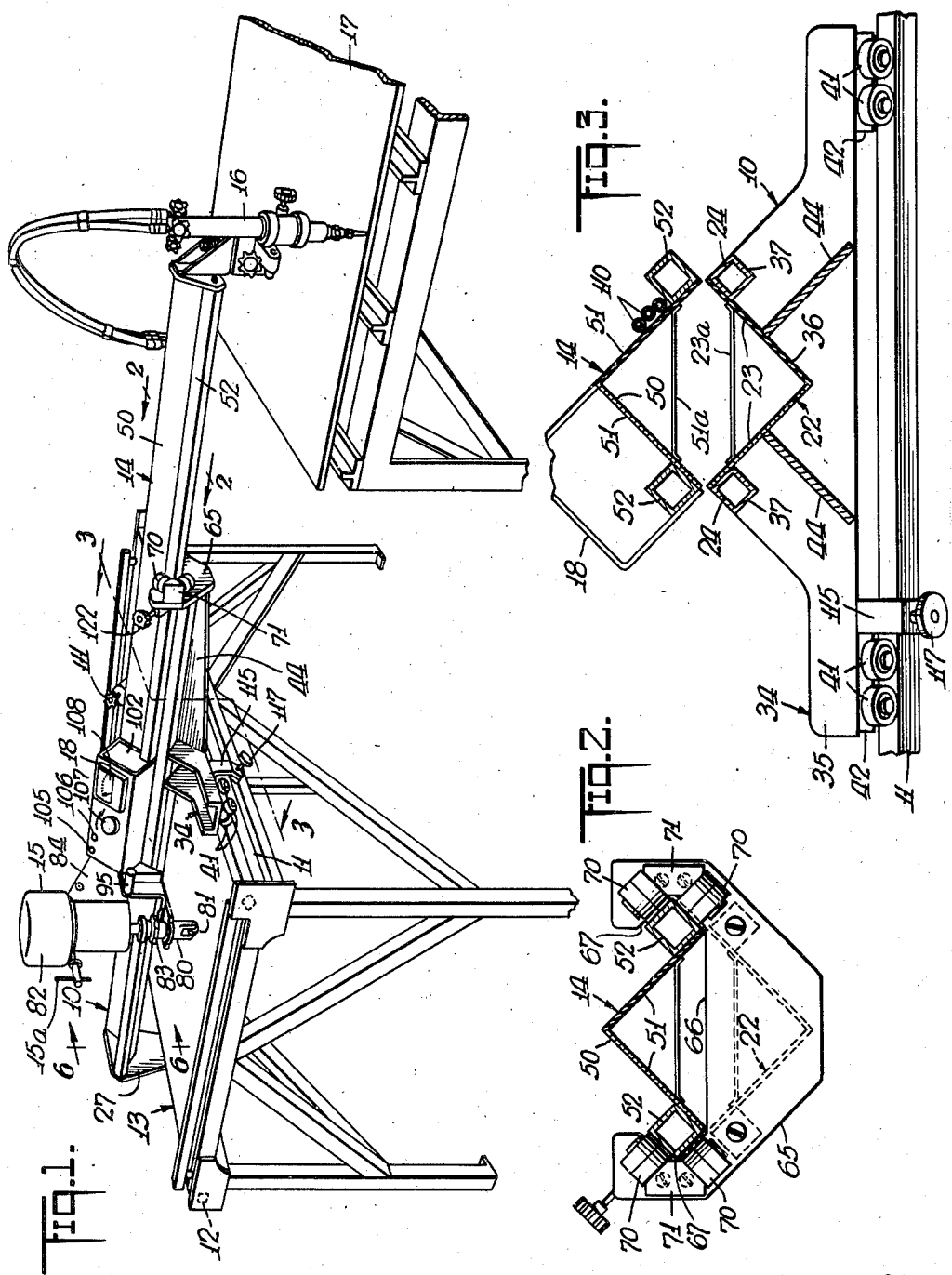
INVENTORS
CHESTER MOTT
ALFRED F. CHOUINARD
JOHN F. DOVE
BY
Dean Fairbanks Hirsch
ATTORNEYS March 18, 1947. C. MOTT ET AL 2,417,511
TORCH CUTTING MACHINE
Filed Nov. 10, 1943 2 Sheets—Sheet 2
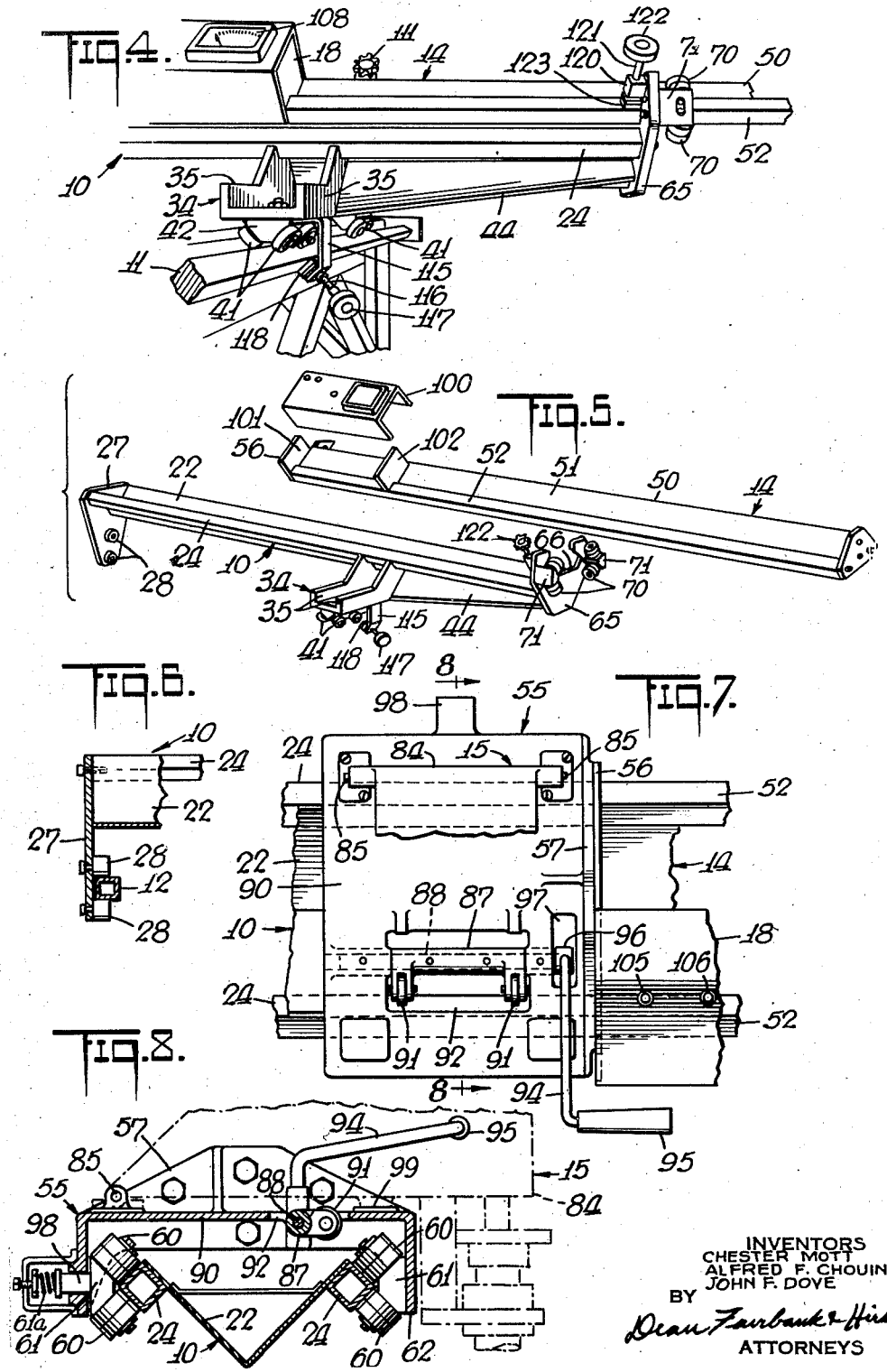
INVENTORS
CHESTER MOTT
ALFRED F. CHOUINARD
JOHN F. DOVE
BY
Dean Fairbank & Hirsch
ATTORNEYS Patented Mar. 18, 1947

2,417,511

UNITED STATES PATENT OFFICE 2,417,511

TORCH CUTTING MACHINE

Chester Mott, Evanston, and Alfred F. Chouinard and John F. Dove, Chicago, Ill., assignors to National Cylinder Gas Company, Chicago, Ill., a corporation of Delaware Application November 10, 1943, Serial No. 509,686

16 Claims. (Cl. 266—23)

The present invention relates to a torch cutting machine of the cross-carriage type in which a carriage is horizontally movable along tracks in one direction, and a second carriage bearing a cutting torch is supported and guided on said first-mentioned carriage for horizontal movement in a direction at right angles to said first-mentioned direction.

Some of the objects of the present invention are to provide a new and improved torch cutting machine of the general type referred to which is comparatively small, light and compact, but which neverthless is rigid and free from vibration, thereby assuring smooth, uniform, accurate movement of the cutting torch in all directions.

Various other objects of the invention will be apparent from the following particular description, and from an inspection of the accompanying drawings, in which:

Fig. 1 is a perspective of the torch cutting machine embodying the present invention;

Figs. 2 and 3 are sections taken on lines 2—2 and 3—3 of Fig. 1 respectively, but on a larger scale;

Fig. 4 is a perspective of a portion of the machine;

Fig. 5 is a perspective of certain parts of the machine shown in separated condition prior to their assembly;

Fig. 6 is a section taken on line 6—6 of Fig. 1;

Fig. 7 is a fragmentary top plan view of a portion of the machine near the tracer and driving unit; and Fig. 8 is a section taken on line 8—8 of Fig. 7.

Referring to the drawings, and especially to Fig. 1, the torch cutting machine of the present invention comprises generally a lower carriage 10 movable horizontally over rails 11 and 12 on the sides of a table 13, and an upper carriage 14 guided and supported on the lower carriage 10 for horizontal movement in the direction at right angles to the direction of movement of the lower carriage 10. This upper carriage 14 carries at one end a motor driven tracer unit 15 adapted to travel over a template, plan or other tracer guide on the table 13, and carries near its other end a cutting torch 16 adapted to travel over a workpiece 17 to flame cut therefrom a shape corresponding to that traced by the unit 15. Also supported on the upper carriage 14 are the machine controls enclosed in a suitable cabinet 18.

The rail 11 (Figs. 1, 3 and 4) on one side of the table 13 is desirably in the form of a bar of square cross-section having its sides extending obliquely at an angle of 45° with respect to the horizontal, and the rail 12 (Fig. 6) on the other side of said table is desirably in the form of a square tubing with its outer sides extending horizontally and vertically.

The lower carriage 10 comprises a V-channel 22 which extends transversely of and above the two rails 11 and 12, and which is desirably right-angled with its two sides 23 converging downwardly at an angle of approximately 45° with the horizontal. Rigidly secured to the outside of the outer edges of the two channel sides 23 by welding or bolting, are the bars 24 respectively, which are desirably of square cross-section, and which are preferably hollow. These bars or tubes 24 serve not only to reinforce the channel 22, but also as guide rails for the upper carriage 14, and also as a means by which certain structures may be secured to the channel 22, as will be described. The sides 23 are braced by transverse bars 23a having their ends welded in place.

For supporting one end of the lower carriage 10 on the table rail 12, there is secured a wheel-bearing plate 27 to one end of the channel 22 desirably by bolting said plate to plugs welded in the ends of the hollow bars 24. This plate 27 carries a pair of freely rotatable wheels 28 adapted to ride along and engaging the opposite horizontal faces respectively of the table rail 12. These two wheels 28 not only support one end of the lower carriage 10 against downward pressure, but also prevent this carriage end from being lifted off the rail 12 when a force is applied to said carriage tending to tilt it, as for example, when the upper carriage 14 projects a substantial distance beyond said lower carriage.

For rollably supporting the lower carriage 10 on the other table rail 11, there is provided a truck desirably comprising a channel frame 34 of U-shaped cross-section having side flanges 35 centrally provided respectively with aligned V-shaped recesses 36 corresponding in shape to the outer V-shaped contour of the channel 22 to snugly receive said channel in seated position therein, and having smaller aligned V-shaped notches 37 on opposite sides of said central recesses 36 for snugly receiving the side channel bars 24 therein as shown in Fig. 3. This truck frame 34 projects a substantial distance beyond the sides of the lower carriage 10, and is welded or otherwise rigidly secured to the channel 22 of said carriage.

Supported from the underside of the truck frame 34 near the outer projecting ends thereof and beyond opposite sides of the carriage 10, are two sets of wheels riding on the table rail 11. Each of these sets of wheels desirably comprises a block 42 bolted or otherwise secured to the underside of the truck frame 34, and rotatably supporting two pairs of opposed wheels 41. These wheels 41 have their axes extending substantially at an angle of 45° with respect to the horizontal to rollably engage the upper inclined faces of the table rail 11. In this manner, the lower carriage 10 is confined by the thrust reaction of its supporting structure against vertical and horizontal movement, except along the table rails 11 and 12, so that vibration of said lower carriage is reduced to a minimum.

The lower carriage channel 22 has its end section projecting outwardly beyond the rail 11. To rigidly support and brace this outwardly projecting end of the channel 22, there is desirably provided a pair of gusset plates 44 welded to the outside flange 35 of the truck frame 34 and to the underside of said channel.

The upper carriage 14 comprises an inverted channel 50, similar in cross-section to the lower carriage channel 22, but reversely positioned over and oppositely with respect thereto with its outer apex edge extending along the top. This upper carriage channel 50 is desirably right-angled and has its sides 51 converging upwardly at an angle of 45° with the horizontal, so that the two carriage channels 22 and 50 define therebetween a hollow of substantially square cross-section. Rigidly secured to the outside of the outer edges of these two channel sides 51 by welding or bolting, are the bars 52 respectively, which are desirably of square cross-section, and which are preferably hollow. These bars 52 serve not only to reinforce the upper carriage channel 50 against transverse bending, but also serve as rails or guides in the lengthwise movement of said channel 50 with respect to the lower carriage 10, as will be made apparent. These side channel bars 52 also serve as a means by which certain structures may be rigidly secured to the channel 50. The sides 51 are braced and held rigid by transverse bars 51a having their ends welded in place.

For guiding the upper carriage 14 along the lower carriage 10, and for supporting at the same time the tracer unit 15, the upper carriage channel 50 carries a tracer supporting truck comprising a fame 55 in the form of a channel straddling the lower carriage channel 22, and rigidly secured to the inner end of said channel 50. For securing the truck frame 55 to the upper carriage channel 50, a plate 56 is desirably fastened to the end of said channel 50, as for example, by bolting to flanges welded in the ends of its side bars 52, and said truck frame 55 has at one end an upstanding flange 57 which is secured to said plate 56, as for example by bolting.

The truck frame 55 has secured thereto two sets of rollers adapted to ride along the rail bars 24 of the lower carriage 10. Each of these sets desirably comprises two pairs of superposed rollers 60 rotatably secured to a block 61. One of these blocks is bolted or otherwise fixed to its adjacent side flange 62 of the truck frame 55, while the other has a stem 98 slidable in the frame 55 and is yieldingly pressed inwardly toward the rail by a spring 61a, thereby making the rolling of the carriage smoother.

These rollers 60 extend with their axes about 45° with respect to the horizontal, so that the upper rollers engage and ride over the upper outer inclined face of the corresponding rail bar 24 of the lower carriage 10, while the lower rollers engage and ride along the lower outer inclined face of said bar. In this manner, the inner end of the upper carriage 14 is guided for movement along the lower carriage 10, and said inner end is held against vertical movement.

The upper carriage 14, intermediate of its ends, is guided for movement along the outer end or cantilever projection of the carriage 10, desirably by means of a roller carrying bracket. Thus, the upper carriage has a cantilever projection beyond the end of the cantilever projection of the lower carriage. This bracket includes a plate 65 secured to the outer end of the lower channel 22, as for example by bolting into the ends of the lower carriage bars 24, and having at its upper side a recess 66 through which the upper carriage channel 50 slidably extends as shown in Fig. 2. This plate recess 66 has angular side conformations 67 conformably receiving the outer inclined faces of the bars 52 of the upper carriage channel 50. The plate 65 has secured thereto two sets of rollers, each set desirably comprising a pair of superposed double rollers 70 rotatably secured to a block 71 fixed to the outer face of the plate 65, as for example by bolting. These rollers 70 have their axes inclined about 45° with the horizontal, and rollably engage the two outer inclined faces of the upper carriage bars 52.

With the truck frame 55 of the upper carriage 14 telescoped or straddled over the lower carriage 10, and the plate 65 on the lower carriage telescoped or straddled over the upper carriage, a compact rolling arrangement is provided between the two carriages which insure smooth accurate movement of the upper carriage along the lower carriage with minimum of vibration. This favorable condition is further enhanced by the thrust reaction of the rolling and rail structure between the two carriages 10 and 14 which prevents horizontal or vertical movement of the upper carriage 14 with respect to the lower carriage except along the rails 24 or 52.

The upper carriage 14 carries at its inner end the motor-driven tracer unit 15 adapted to travel over a template, plan or other tracer guide on the table 13. This tracer unit 15 per se forms no part of the present invention, and may be of the general type shown in patent 2,336,626, issued December 14, 1943. This tracer unit 15 may, for example, comprise a tracing head 80 having a drive wheel 81 which is driven from a motor enclosed by a cover 82, and which is manually steered along a plan by a wheel 83. This tracing head 80 may be replaced by a template tracer comprising tension and driving rollers adapted to grip a template and follows its contour so that the shape is automatically cut out of the plate 17 by the cutting torch 16.

The tracer unit is preferably provided with some suitable locking means operated by a handle 15a to prevent it, if desired, from turning, and so that the tracer wheel can travel only in a direction parallel to the rails 11 and 12 or in a direction at right angles thereto for making straight cuts, without following a drawing, template, or other guide.

The tracer unit 15 is mounted on the truck frame 55 in a manner to permit the tracer head to be raised, so that it clears the master drawing or template. For that purpose, the frame 84 of the tracer unit 15 is pivotally supported at 85 to the truck frame 55.

A lever mounted on the truck frame 55 to lift the tracer unit 15, desirably comprises a crank 87 which is secured to a crank shaft 88 journalized in the upper plate 90 of the truck frame 55, and which carries a pair of spaced rollers 91 adapted to project upwardly through an opening 92 in said frame plate into lifting engagement with the tracer frame 84 when said crank shaft is turned. To turn the crank shaft 88 for tracer lifting operation, there is secured to one end of said shaft one end of an arm 94 extending transversely of said shaft and offset at its other outer end to form a lifting handle 95. This arm 94 may be secured to the crank shaft 88, as for example through an intervening block 96 adapted to project through an opening 97 in the upper plate 90 of the truck frame 55, and extends unostensibly between the tracer unit 15 and the inner end of the upper carriage channel 50. The handle 95 of this arm 94 extends along the front of the upper carriage channel 50 in easily accessible position for tracer lifting operation.

When it is desired to lift the tracer head, for example, to permit rapid manual movement of the upper carriage 14 at the beginning or end of a cutting operation, the crank handle 95 is lifted from the positions shown in Figs 7 and 8 until the crank rollers 91 engage the underside of the tracer frame 84. Continued upward movement of the crank handle 95 causes the entire tracer unit 15, including its drive motor, to be tilted back about its pivot supports at 85. With the roller-carrying arms of the crank 87 extending substantially vertically upwardly and slightly backwardly, the tracer unit 15 will be supported in raised tilted position without the necessity of holding on to the crank handle 95.

When it is desired to lower the drive wheel of the tracer unit 15 into operative tracing position, the handle 95 is lowered until the tracer wheel 81 rests on the table. Thus, the tracer unit may follow any variation in the table by pivoting about the pivot points 85. If a template tracer is used, a block may be inserted between the bottom of the tracer unit 15 and the top surface of the truck frame 55 near the lifting handle 95 to hold the template tracer perpendicular to the vertical surface of the template.

By providing the rails 52 on the upper carriage 14 and positioning on end of the lower carriage, the rollers 70 which engage said rails intermediate of their ends, the outer end of the upper carriage may move from a position adjacent to the outer end of lower carriage to a position far beyond the end of the lower carriage. By providing the rails 24 on the lower carriage 10 and supporting on the upper carriage 14, the rollers 60 riding on said rails, the movement of the upper carriage with respect to the lower carriage can be effected without interference from the tracer unit 15.

The electric control cabinet 18 is secured to the upper carriage 14 at the inner end of the channel 50. This control cabinet 18 desirably comprises an inverted U-shaped channel 100 of substantially rectangular cross-section, seated on the forward inclined side 51 of the upper carriage channel 50 to close the open side of said cabinet channel 100. One end of this cabinet channel 100 is closed by an extension 101 of the plate 56, while the other end is closed by a plate 102 welded or otherwise secured to the upper carriage channel 50. The cabinet channel 100 and the plates 56 and 102 are rigidly secured together by welding or bolting.

The cabinet 18 encloses the electric control circuit and has a front panel with controls which are easy to reach or read from the front of the machine. This control panel desirably contains a reverse switch 105, a stop-start switch 106, a speed control 107, and a speed tachometer 108 calibrated in inches per minute.

The three tubes 110 supplying high pressure oxygen, low pressure oxygen and fuel gas to the torch 16 from the supply tanks are desirably supported on the rear of the upper carriage 14 in the trough formed along the rear of the channel 50 between the rear side 51 and rear rail bar 52, as shown in Fig. 3. The high pressure oxygen tube has a control valve operable from a handle 111 easily accessible from the front of the machine.

Brakes are desirably provided to lock the lower carriage 10 for straight cuts in a direction laterally of the table rails 11 and 12, and to lock the upper carriage 14 to the lower carriage 10 for straight cuts in a direction parallel to said table rails. The brake for locking the lower carriage 10 against movement along the table rails 11 and 12 desirably comprises a bracket 115 fixed to the underside of the truck frame 34 and a screw 116 threaded in said bracket and extending in an upwardly inclined direction at right angles to the plane of the lower outer face of the table rail 11. The outer end of this screw 116 carries a handwheel 117 while the inner end carries a brake shoe 118 lined with suitable friction material, such as asbestos, and having a swivel connection with said screw. By turning the screw 116 in a direction to apply the brake shoe 118 firmly against the lower outer face of the table rail 11, the lower carriage 10 can be locked against movement along the table rails 11 and 12. The movement of the cutting torch 16 can thereby be confined to that permitted by the movement of the upper carriage 14 longitudinally along the lower carriage 10, so that the resulting cut will be along a straight line laterally of the table rails 11 and 12.

The brake for locking the upper carriage 14 to the lower carriage 10 comprises a bracket 120 fixed to the inner side of the frame plate 65 and screw 121 threaded in said bracket and extending in a downwardly inclined direction at right angles to the plane of the upper outer side of the front upper carriage rail bar 52. The upper end of this screw 121 carries a handwheel 122, while the lower end carries a brake shoe 123 lined with suitable friction material, such as asbestos, and having a swivel connection with said screw. By turning the screw 121 in a direction to apply the brake shoe 123 firmly against the upper outer face of the front upper carriage rail bar 52, the upper carriage 14 will be locked to the lower carriage 10. In this way, the movement of the cutting torch 16 is confined to that permitted by the movement of the lower carriage 10 along the table rails 11 and 12, so that the resulting cut will be along a straight line parallel to the table rails 11 and 12.

The two brakes referred to can be employed to lock the carriages 10 or 14 as described, or may be merely used to regulate the resistance with which these carriages move along these rails.

The torch 16 is shown supported on the outer end of the upper carriage 14 in a manner shown and described in copending applications Serial Nos. 480,634 and 484,873, to permit said torch to be angularly and radially adjusted or advanced horizontally with respect to said carriage, and to permit said torch to be angularly tilted about vertical planes for straight or level cutting.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

We claim:

1. In a torch cutting machine, the combination comprising a cutting torch, a drive and tracer unit, means interconnecting said torch and said unit to cause said torch to duplicate the tracing movement of said unit, and means pivotally supporting said unit for angular movement about a horizontal axis, whereby said unit may be angularly raised into inoperative or lowered into tracing drive position.

2. In a torch cutting machine, the combination comprising a carriage movable in a straight horizontal direction, a second torch bearing carriage, means supporting and guiding said second carriage on said first carriage for horizontal movement with respect thereto in a direction laterally of said first-mentioned direction, a tracer drive unit pivotally supported on said second carriage, and means for angularly raising a horizontal unit about said axis into inoperative position.

3. In a torch cutting machine, the combination comprising a carriage support having a pair of parallel, transversely spaced, horizontal rails, each having a pair of inclined adjoining traction surfaces in angular relationship, a carriage having a cutting torch at one end thereof, and a pair of rollers supported on each side of said carriage with their axes extending parallel to the respective traction surfaces of a corresponding rail to rollably engage said surface respectively.

4. In a torch cutting machine, the combination comprising a carriage support having a longitudinal V-channel with its sides converging downwardly, a torch carriage having a longitudinal V-channel with its sides converging upwardly, and means for supporting and guiding said carriage on said carriage support for lengthwise movement and comprising a plurality of horizontal parallel rails, one connected to the outer edge of each of said channel sides, rollers on said carriage and adapted to ride on the rails of said support and rollers on said support adapted to ride on the rails of said carriage.

5. In a torch cutting machine, the combination comprising a carriage support, a torch carriage above said support and having a V-channel with its sides converging upwardly, a pair of horizontal parallel rails connected to the outer edges of the sides of said channel respectively, and rollers on said carriage support rollably engaging said rails.

6. In a torch cutting machine, the combination comprising a pair of superposed V-channels disposed with their concave sides facing each other, means for supporting the upper channel for lengthwise horizontal movement along the lower channel and comprising said rails on each of said channels, and rollers on each of said channels riding on the rails of the other channel, and means for supporting a torch on said upper channel.

7. A flame cutting machine of the type in which there are provided a carriage support, a carriage mounted on said support and movable endwise, said carriage having a cutting torch at one end and a motor driven propelling device at the other end, said machine being characterized by two pairs of parallel horizontally spaced rails, one pair forming a part of said support and the other pair forming a part of said carriage, the rails of the carriage being disposed above and parallel to the rails of said support, and each of said rails having inclined upwardly and downwardly facing surfaces, the carriage being provided at the end farthest from the torch with rollers having inclined axes engaging said upper and lower inclined surfaces of the rails of said support, and the carriage, and the carriage at the end nearest to said torch, having rollers provided with inclined axes and engaging said upper and lower inclined surfaces of the rails of said support.

8. A torch cutting machine of the type in which there are provided a carriage support and a carriage movable endwise on said support, and in which said carriage is provided with a motor driven tracing device at one end and a cutting torch at the opposite end, said machine being characterized by the provision of a pair of parallel horizontally spaced rails on said carriage and a pair of parallel horizontally spaced rails on said support, one pair of rails being disposed above and parallel to the other pair of rails, rollers carried by the support at the end nearest to said torch and engagable with the under side of the rails of the carriage intermediate of the ends of the latter, and rollers carried by said carriage at the end carrying said tracing device and engageable with the under side of the rails of said support intermediate of the ends of the latter, whereby one set of rollers moves toward and from the other set during the endwise movement of the carriage.

9. A torch cutting machine of the type in which there are provided a carriage support, and a carriage movable endwise on said support, and in which said carriage is provided with a motor driven tracing device at one end and a cutting torch at the opposite end, said machine being characterized by the provision of two pairs of parallel horizontally spaced rails, one pair on said carriage and the other on said support, the rails of said carriage being disposed above and parallel to the rails of the support, rollers carried by the support at the end nearest to said torch and engageable with the upper and lower sides of the rails of the carriage intermediate of the ends of the latter, and rollers carried by the carriage at the end carrying said tracing device and engageable with the upper and lower surfaces of the rails of the support intermediate of the ends of the latter, whereby one set of rollers moves toward and from the other set during the endwise movement of the second mentioned carriage.

10. A flame cutting machine including a carriage support and a superposed carriage each having a pair of horizontally spaced rails, one pair of rails being directly above and parallel to the other pair of rails, and each rail having a pair of oppositely inclined upper and lower surfaces, and said carriage and said support each having four rollers, two engaging the upper surface and the other two engaging the lower surface of the rails of the other, the carriage having a cutting torch at one end and a traction propelling device at the opposite end, the rollers of said support being at the end thereof nearest to said torch and the rollers on said carriage being at the end farthest from said torch.

11. A shape cutting machine comprising in combination a carriage adapted for conveying a cutting implement and a propelling unit, a pair of horizontally spaced rails on said carriage, a pair of horizontally spaced supporting rails disposed directly below and parallel to the first mentioned rails, said carriage and said support each having rollers engaging the upper and lower sides of each of the rails on the other.

12. A shape cutting machine comprising in combination a carriage adapted to move endwise for conveying a cutting implement and a propelling unit, a carriage support, a pair of horizontally spaced rails on said carriage, a pair of horizontally spaced rails on said support and disposed directly below and parallel to the first mentioned rails, each of said rails having inclined surfaces at substantially right angles to each other, said carriage and said support each having rollers with inclined axes and having rolling engagement with oppositely inclined upper and lower sides of each of the rails on the other.

13. A shape cutting machine comprising a table having a downwardly facing rail along one edge and a rail along the opposite edge and presenting oppositely inclined surfaces, a carriage movable over said table and having a roller at one end engaging the first mentioned rail, and a pair of rollers intermediate of the ends of said carriage, spaced apart transversely of said carriage, having inclined axes, and engaging the inclined surfaces of said second mentioned rail, whereby said carriage extends substantially beyond the last mentioned edge of said table.

14. A torch cutting machine of the type in which there is provided a pair of superposed parallel longitudinally extending carriages, the lower carriage being movable laterally and the upper carriage being movable longitudinally of the lower carriage and having a cutting torch and a tracing unit mounted thereon adjacent to opposite ends, said machine being characterized by having a pair of parallel horizontally spaced rails extending lengthwise of each carriage, and each rail having oppositely inclined downwarly facing traction surfaces, the rails of the upper carriage being directly above and parallel to those of the lower carriage, a pair of rollers having oppositely inclined axes supported on opposite sides of the upper carriage adjacent to the end having said tracing unit and engaging the inclined surfaces of the rails of the lower carriage, and a pair of rollers having oppositely inclined axes supported on opposite sides of the lower carriage at the end nearest to the cutting torch and engaging the inclined surfaces of the rails of the upper carriage.

15. A torch cutting machine of the type in which there is provided a pair of superposed parallel longitudinally extending carriages, the lower carriage being movable laterally and the upper carriage being movable longitudinally of the lower carriage and having a cutting torch and a tracing unit mounted thereon adjacent to opposite ends, said machine being characterized by having a pair of parallel horizontally spaced rails extending lengthwise of each carriage, each rail having oppositely inclined upwardly and downwardly facing traction surfaces, the rails of the upper carriage being directly above and parallel to those of the lower carriage, two pairs of rollers, supported on opposite sides of the upper carriage adjacent to the end bearing said tracing unit, the rollers of each pair having oppositely inclined axes engaging the inclined surfaces of the rails of the lower carriage, and two pairs of rollers supported on opposite sides of the lower carriage at the end nearest to the cutting torch, the rollers of each pair having oppositely inclined axes engaging the inclined surfaces of the rails of the upper carriage.

16. A torch cutting machine of the type in which there is provided a pair of superposed parallel longitudinally extending carriages, the lower carriage being movable laterally and the upper carriage being movable longitudinally of the lower carriage and having a cutting torch and a tracing unit mounted thereon adjacent to opposite ends, said machine being characterized by having each carriage formed of a V-shaped body with a pair of parallel rails at the edges thereof and with the sides of the body of the upper carriage converging upwardly and the sides of the body of the lower carriage converging downwardly, and with the rails of the upper carriage directly above and parallel to those of the lower carriage, the rails of the upper carriage having oppositely inclined traction surfaces, and the rails of the lower carriage having oppositely inclined traction surfaces, a pair of rollers having oppositely inclined axes supported on opposite sides of the upper carriage adjacent to the end bearing said tracing unit and engaging the inclined traction surfaces of the rails of the lower carriage, and a pair of rollers having oppositely inclined axes supported on opposite sides of the lower carriage at the end nearest to the cutting torch and engaging the inclined traction surfaces of the rails of the upper carriage.

CHESTER MOTT.
ALFRED F. CHOUINARD.
JOHN F. DOVE.

REFERENCES CITED

The following references are of record in the file of this patent:

UNITED STATES PATENTS

| Number | Name | Date |
| --- | --- | --- |
| 1,653,990 | Covey | Dec. 27, 1927 |
| 2,269,636 | Mott | Jan. 13, 1942 |
| 2,279,358 | Oldham | Apr. 14, 1942 |
| 2,305,167 | Kasper | Dec. 15, 1942 |
| 603,871 | Bublitz | May 10, 1898 |
| 956,696 | Frost | May 3, 1910 |
| 164,440 | Furman | June 15, 1875 |
| 258,457 | Melvin | May 23, 1882 |
| 365,196 | Palmer et al. | June 21, 1887 |

FOREIGN PATENTS

| Number | Country | Date |
| --- | --- | --- |
| 285,959 | British | Feb. 22, 1928 |